June 24, 1941.  C. D. PETERSON ET AL  2,246,636

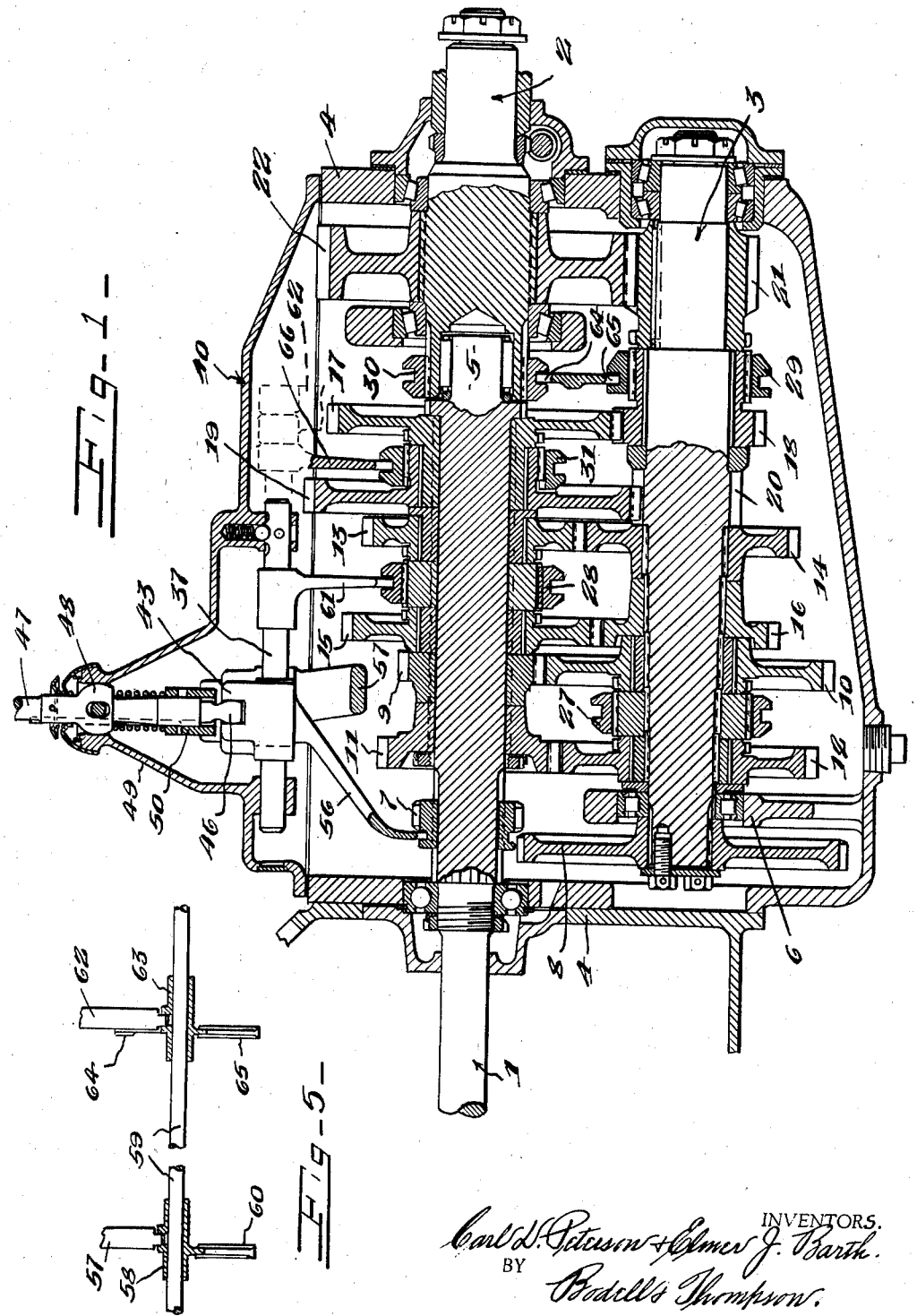

TRANSMISSION GEARING

Filed Feb. 7, 1940   2 Sheets-Sheet 2

INVENTORS.
Carl D. Peterson + Elmer J. Barth
BY Bodell + Thompson
ATTORNEYS.

Patented June 24, 1941

2,246,636

UNITED STATES PATENT OFFICE 2,246,636

TRANSMISSION GEARING

Carl D. Peterson and Elmer J. Barth, Toledo, Ohio, assignors to Spicer Manufacturing Corporation, Toledo, Ohio, a corporation of Virginia Application February 7, 1940, Serial No. 317,724

3 Claims. (Cl. 74—333)

This invention relates to change-speed transmission gearing, and has for its object a compact arrangement of selectively operable trains of gears between the input, counter and output shafts, whereby a maximum number of gear shifts may be obtained within a given axial length.

More specifically, it has for its object a transmission gearing in which two shiftable elements or clutches are coupled together and shifting of the same in one direction from neutral effects a drive through one gear ratio and in the other direction from neutral effects direct drive, and while these two clutches are in neutral position, indirect drives may be effected through any one of a number of gear trains.

It further has for its object a transmission gearing where one speed is obtained through a train of gears including a gear keyed to or rotatable with the input shaft and meshing with the gear rotatable about the counter shaft and selectively clutched thereto by one of said clutches, when shifted in one direction from neutral, and another speed is obtained through another gear train including a gear normally rotatable about the input shaft and selectively clutchable to the gear that is keyed to the input shaft to transmit motion to the output shaft through a gear rotatable with the counter shaft.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of a transmission gearing embodying this invention.

Figure 5 is a fragmentary view of two of the shifting forks and contiguous parts.

Figure 4:
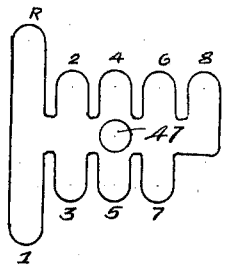
Figure 4 is a diagrammatic view illustrating the operation of the selecting and shifting lever.

1, 2 and 3 designate respectively the input, output and counter shafts of the gearing; the input and output shafts 1, 2 being mounted in axial alinement in suitable bearings in the gear box 4, and one having a pilot bearing at 5 in the other. The counter shaft 3 is mounted in suitable bearings in the gear box 4, one of these bearings 6 being inset from one of the end walls of the box.

7 and 8; 9 and 10; 11 and 12; 13 and 14; 15 and 16; 17 and 18; and 19 and 20 designate trains of gears between the input shaft 1 and the counter shaft 3 for producing different speeds.

Figure 3:
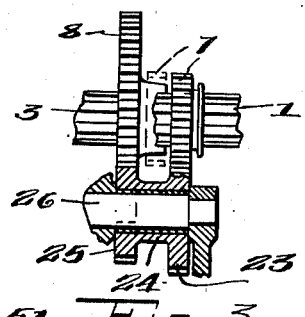
Figure 3 is a fragmentary plan view of the reverse gear.

21 and 22 designate the gears of a final drive between the counter shaft 3 and the output shaft 2, these being rotatable with or keyed to the shafts 3 and 2 respectively. The gear 7 is also used in a reverse gear train shown in Figure 3 which will be hereinafter described.

Each of these several gear trains includes a shiftable element, which may be a gear itself or a clutch for operatively transmitting its motion from the input shaft 1 to the counter shaft 3. As here shown, the gear 7 is splined to the input shaft 1 and shiftable axially in one direction from neutral, as to the left (Figure 1), to shift it into mesh with its companion gear 8 and in the opposite direction from neutral into mesh with the gear 23 of a reverse spool 24, the other gear 25 of which meshes with the gear 8. The reverse spool is mounted on a suitable spindle or stud 26 mounted in the gear box.

First speed or low gear forward is effected through the gears 7, 8; second speed forward is effected through the gears 9, 10; and third speed through the gears 11 and 12. The gears 9, 11 are keyed or splined to the input shaft side by side and the gears 10, 12 are mounted to rotate about the counter shaft 3 or about collars or bushings on the counter shaft, and are selectively clutchable thereto by a clutch 27 shiftable in one direction, as to the right, to clutch the gear 10 to the counter shaft 3, and in the other direction, as to the left, to clutch the gear 12 to the counter shaft 3. The gears 9 and 10 and 11 and 12 produce second and third speeds.

The gears 13 and 15 are normally rotatable about the input shaft 1 or collars or bushings thereon, and the companion gears 14 and 16 are keyed to the counter shaft 3 side by side. The gears 13 and 15 are operatively connected to the input shaft 1 by a clutch 28 shiftable in one direction, as to the right, to clutch the gear 13 to the input shaft 1 to effect fourth speed forward, and in the opposite direction, or to the left from neutral, to clutch the gear 15 to the input shaft to effect fifth speed forward.

The gear 17 is keyed to the input shaft 1 and meshes with the gear 18 normally rotatable about the counter shaft 3 and clutchable thereto to effect sixth speed forward, it being here shown as clutchable to the counter shaft by a shiftable clutch 29 slidably splined on the hub of the gear 18 and shiftable in one direction, as to the right from neutral, into clutching engagement with the hub of the gear 21 of the final drive train, which gear 21 is keyed to the counter shaft 3. The clutch 29 is shiftable idly to the left.

Seventh speed is direct drive between the input and output shafts 1, 2 and is effected by a clutch section 30 slidably splined to the output shaft 2 and shiftable axially in one direction from neutral, as to the left in Figure 1, into engagement with clutch teeth on the input shaft 1 to connect the input and output shafts together in direct drive relation. It is shiftable idly in the opposite direction, or to the right from neutral, while the clutch section 29 is being shifted to the right to clutch the gear 18 to the counter shaft 3. These two clutches 29 and 30 are shown connected to one shift fork.

Eighth speed forward, which is an over-drive, is accomplished through the gears 19, 20, the gear 19 being normally rotatable about the input shaft 1, it being here shown as rotatable on the hub of the gear 17, which is keyed to the input shaft 1, and it is connectable to the shaft 1 to rotate therewith by means of a clutch section 31 slidably splined on the hub of the gear 19 and shiftable axially in one direction, as to the right, into engagement with the clutch teeth on the gear 17, which gear 17, it will be noted, meshes with the gear 18 which normally idles about the counter shaft 3. Thus, the gear 17 not only performs the function of transmitting its own motion to the counter shaft 3 and its companion on the counter shaft 3 clutched thereto, but also serves as a driver for another train of gears, that is, the over-drive including the gears 19, 20. Also, it will be noted that two gears on the input shaft are keyed to the input shaft, these being the gears 9 and 11 and the next two gears on the input shaft are rotatable about the input shaft and clutchable thereto, these being the gears 13, 15, while the companion gears of the first two gears 9 and 11 are rotatable about the counter shaft and clutchable thereto and the companion gears 14 and 16 of the gears 13 and 15 are keyed to the counter shaft 3 and that the gear 7, which effects first speed forward and reverse, is shiftable axially of the input shaft 1.

In the grouping of the gear trains in the gear box, the gears 9 and 11 constitute one pair of gears located side by side on the input shaft 1 and rotatable therewith; 13 and 15 constitute a second pair of gears mounted adjacent the first gear on the input shaft and normally rotatable about the same and clutchable thereto; 10 and 12 constitute a third pair of gears, these meshing with the gears of the first pair and being mounted and rotatable about the counter shaft and selectively clutchable thereto. 14 and 16 is a fourth pair of gears keyed to the counter shaft and meshing with the second pair of gears. 17 and 19 constitute a fifth pair of gears, one of which, as the gear 17, is keyed to the input shaft and the other 19 of which is rotatable about the input shaft and clutchable to the gear 17, in order to rotate with the input shaft. 18 and 20 designate the sixth pair of gears meshing with the gears 17 and 19 respectively, one as the gear 18, being rotatable about the counter shaft 3 and selectively clutchable thereto, and the other gear 20 being rotatable with the counter shaft 3, it being here shown as integral with the counter shaft. This results in a compact arrangement of the gear trains producing five speeds forward and reverse and permitting first speed and reverse to be operated from one shift rod; second and third speeds from one shift rod; and fourth and fifth speeds from one shift rod.

The arrangement of the clutches 29 and 30 coupled together to act as a unit, one shifting idly while the other is shifted into operative position, is another feature adding to the axial compactness of the gearing. The clutch 29, when shifted to the right from neutral, effects sixth speed forward through the gears 17, 18, the clutch 29 clutching the gear 18 to the counter shaft through the hub of the gear 21 of the final drive train and the clutch 30 connecting the input and output shafts 1, 2 in direct drive relation, when shifted to the left from neutral.

It will be also noted that the gear 17, which is keyed to the input shaft 1 and is the drive gear of the train of gears effecting the sixth speed, is utilized to clutch the gear 19 in driving relation to effect the eighth speed forward or over-drive through the clutch 31 which, when shifted to the right (Figure 1), clutches the hub of the gear 19 to the hub of the gear 17. This arrangement of the clutch 31 and gear 17, clutches 29 and 30 contributes to the axial compactness of the change-speed gearing embodying considerably more gear changes than are generally used and permits a gearing with a multitude of gear changes to be used in the smallest available space or the space available for gear boxes having less gear changes.

Gear boxes usually have three, four and five speeds forward and reverse. By this arrangement of gears, eight speeds forward and reverse are practical in the same axial space.

The selecting and gear shifting mechanism includes rods, forks operated thereby, and the selecting and gear shifting lever coacting with selector blocks on the shift rods in the usual manner. 35, 36, 37, 38 and 39 designate the shift rods slidably mounted in the gear box, as seen in Figure 1, or in the cover 40 thereof. These are shiftable to effect respectively, first and reverse speeds; second and third; fourth and fifth; sixth and seventh; and eighth speeds. Each of them has a selector block 41, 42, 43, 44 and 45 for coacting with the finger 46 of the selecting and shifting lever, which has a lateral selecting movement and a fore and aft shifting movement. 47 designates the lever, which is suitably mounted to have a selecting and shifting movement at 48 in the tower 49 of the cover 40. These selector blocks are formed with the usual notches for receiving the finger 46, all of the notches being arranged in alinement when all shift rods are in neutral position. A suitable lock 50 is provided for preventing unconscious shifting into eighth speed or into first and reverse. This lock consists of an axially movable, spring-pressed sleeve slidable on the lower arm of the lever 47 and arranged to engage a barrier 51 when a shift is to be made into engagement with the first and reverse shift rod 35 and into engagement with a barrier 52 when a shift is to be made into engagement with the shift rod 39. The spring-pressed sleeve 50 is operable out of engagement with the barrier in any suitable manner, not shown, as a grip lever on the handle end of the shifting lever 47 and connected by a rod or link to the lock 50.

56 designates the fork on the first and reverse shift rod 35, this fork coacting with a groove in the hub of the gear 7.

Figure 2:
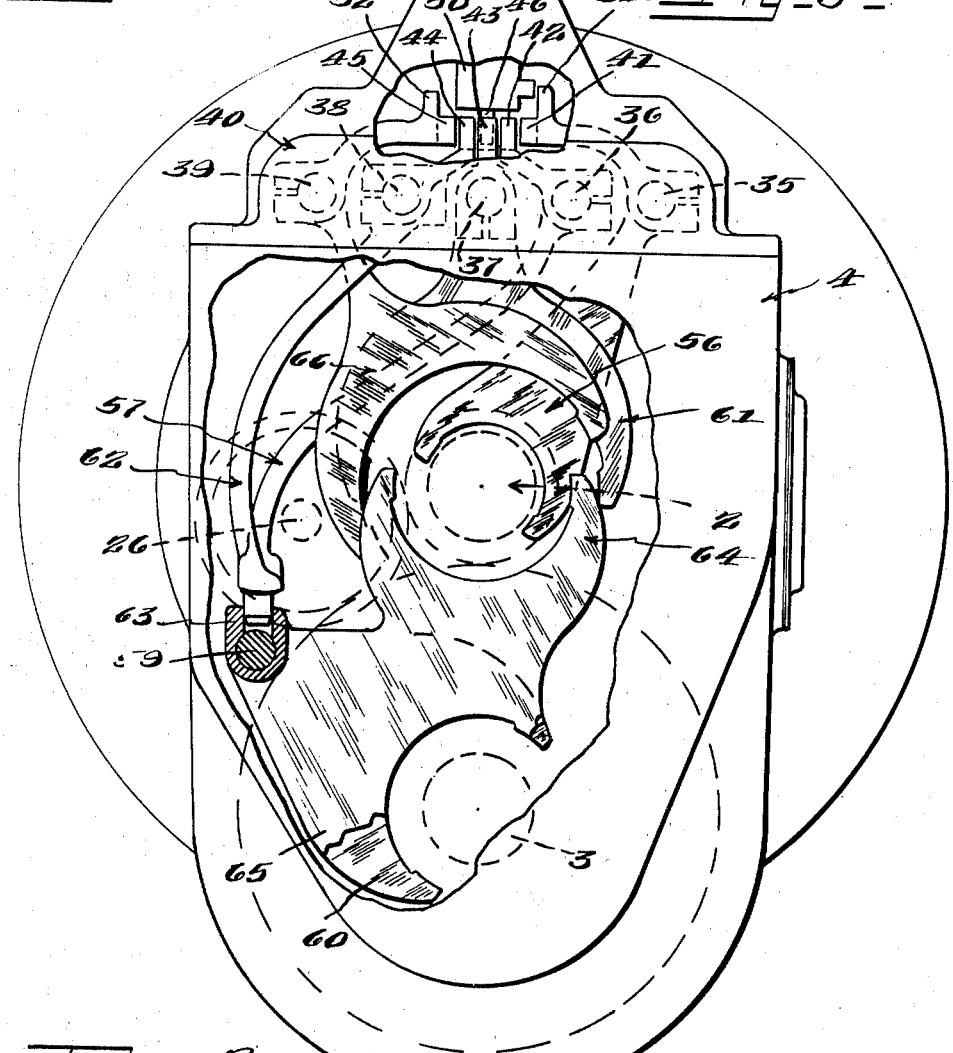
Figure 2 is a fragmentary end view looking to the left in Figure 1.

57 designates an arm shifted by the second and third shift rod 36, this coacting with a slide 58 (Figure 5) movable along a guide rod 59 in the casing and having a fork 60 (Figure 2) coacting with the shiftable clutch 27 which operates to clutch the gears 10 and 12 to the counter shaft to effect second and third speeds.

61 designates a fork connected to the shift rod 37 which effects fourth and fifth speeds forward, this fork 61 coacting with the clutch section 28 operable to alternately clutch the gears 13 and 15 to the input shaft 1 to effect fourth and fifth speeds forward.

62 designates an arm shiftable with the shift rod 38 which effects sixth and seventh speeds forward, this arm 62 being similar to the arm 57 and coacting with the slide 63 on the guide rod 59, which slide 63 has a double fork 64 and 65 coacting respectively with the clutches 29 and 30. The clutch 29 operates to clutch the gear 18 to the counter shaft to produce sixth speed and the clutch section 30 operates to connect the input and output shafts 1, 2 in direct drive relation to effect seventh speed.

66 designates the fork movable with the shift rod 39 and coacting with the clutch section 31 which is shiftable in one direction only from neutral to clutch the gear 19 to the gear 17, which gear 17 is keyed to the input shaft 1. When the clutch 31 is operated to clutch the gear 19 to the input shaft 1 through the gear 17, the eighth speed results which is an overdrive.

By reason of the gear arrangement and the clutch arrangement, a transmission gear of greater capacity, as eight speeds forward and reverse, may be arranged in a minimum axial available space as compared with three or four speeds forward, and the gear changes selected and effected with the usual selecting and shifting mechanism, it being only necessary to add shift rods and their forks.

What we claim is:

1. In a transmission gearing, the combination of input and output shafts arranged in axial alinement, a counter shaft, trains of change-speed gears between the input and counter shafts including selectively operable shiftable elements operable to operatively connect the input and output shafts together through different speed ratios, one of said speed ratios being through a gear on the counter shaft, a final drive train of gears between the counter shaft and the output shaft including gears rotatable with said shafts, the shiftable elements to effect two of said gear ratios including two clutches shiftable as a unit and shiftable in one direction from neutral to clutch one of the gears of the counter shaft to the counter shaft and in the other direction from neutral to connect the input and output shafts together in direct drive relation, and means for selecting and shifting the shiftable elements, and additional selectively operable gear trains between the input shaft and the counter shaft to transmit additional different gear ratios through the final drive gear train to the output shaft.

2. In a transmission gearing, the combination of input and output shafts arranged in axial alinement, a counter shaft, trains of change-speed gears between the input and counter shafts including selectively operable shiftable elements operable to operatively connect the input and counter shafts together through different speed ratios, a final drive train of gears between the counter shaft and the output shaft including gears rotatable with said shafts, the shiftable elements to effect two of said gear ratios including two clutches shiftable as a unit and shiftable in one direction from neutral to clutch one of the gears on the counter shaft to the counter shaft and in the other direction from neutral to connect the input and output shafts together in direct drive relation, and a third clutch, one of the trains of gears controlled by one of said two clutches including a gear rotatable with the input shaft and its companion gear on the counter shaft with which one of said two clutches rotates, the other of said trains of gears being controlled by the third clutch comprising a gear normally rotatable about the input shaft, and its companion gear on the counter shaft, the third clutch being operable to connect said gear normally rotatable about the input shaft to said gear on the input shaft normally rotatable therewith.

3. In a transmission gearing, a suitable casing, the combination of input and output shafts journalled in the casing in axial alinement, a counter shaft journalled in the casing, trains of change-speed gears between the input and counter shafts including shiftable members selectively operable to operatively connect the input and counter shafts together through different speed ratios, a final drive train of gears between the counter shaft and the output shaft including gears rotatable with said shafts, said change-speed gears including a pair of gears mounted on and keyed to the input shaft, a second pair of gears rotatable about the input shaft, a third pair of gears normally rotatable about the counter shaft and meshing with the gears keyed to the input shaft, a fourth pair of gears keyed to the counter shaft and meshing with the second pair of gears on the input shaft, a fifth pair of gears mounted on the input shaft, one gear of the fifth pair being keyed to the input shaft and the other rotatable about the same, a sixth pair of gears meshing respectively with the gear of the fifth pair, one being rotatable with the counter shaft and the other about the same respectively, selectively operable clutches, one being operable in opposite directions from neutral to respectively clutch one or the other of the third pair of gears to the counter shaft and a second clutch operable to clutch one or the other of the second pair of gears to the input shaft, a third clutch being operable to clutch the gear of the fifth pair of gears, which is rotatably mounted about the input shaft to the gear of the fifth pair which is keyed to the input shaft, and a fourth clutch operable to clutch the gear of the sixth pair which is rotatably mounted on the counter shaft to the counter shaft, and a fifth clutch operable to clutch the input and output shafts directly together, the fourth and fifth clutches being connected together to shift in opposite directions from neutral, as a unit, when shifted in one direction, the fourth clutch operating and the fifth clutch idling, and when shifted in the other direction, the fifth clutch operating and the fourth clutch idling, and means for selecting and operating the clutches.

CARL D. PETERSON.
ELMER J. BARTH.